(12) United States Patent (10) Patent No.: US 7,677,488 B2
Hiraguchi (45) Date of Patent: Mar. 16, 2010

(54) RECORDING TAPE CARTRIDGE

(75) Inventor: Kazuo Hiraguchi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 1053 days.

(21) Appl. No.: 10/902,388

(22) Filed: Jul. 30, 2004

(65) Prior Publication Data

US 2005/0023400 A1 Feb. 3, 2005

(30) Foreign Application Priority Data

Aug. 1, 2003 (JP) .............................. 2003-285127

(51) Int. Cl.
*G11B 23/107* (2006.01)
(52) U.S. Cl. ................................... 242/338.1; 242/348
(58) Field of Classification Search ............. 242/338.1, 242/338.3, 343, 348; 360/132
See application file for complete search history.

(56) References Cited

U.S. PATENT DOCUMENTS

| | | | | |
|---|---|---|---|---|
| 4,736,903 | A | * | 4/1988 | Landry et al. ............. 242/338.3 |
| 5,657,937 | A | * | 8/1997 | Todd et al. ................ 242/345.1 |
| 5,813,622 | A | | 9/1998 | von Alten |
| 6,038,112 | A | * | 3/2000 | Kletzl ........................ 360/132 |
| 6,271,991 | B1 | | 8/2001 | Saliba et al. |

FOREIGN PATENT DOCUMENTS

| | | |
|---|---|---|
| JP | 63-251983 A | 10/1988 |
| JP | 05-274838 A | 10/1993 |
| JP | 11-25648 A | 1/1999 |
| JP | 11-273307 | 10/1999 |
| JP | 3187022 B2 | 5/2001 |

OTHER PUBLICATIONS

Japanese Office Action dated Aug. 18, 2009, issued in Counterpart Japanese Application No. 2004-104420.

* cited by examiner

*Primary Examiner*—John Q Nguyen
*Assistant Examiner*—Scott Haugland
(74) *Attorney, Agent, or Firm*—Sughrue Mion, PLLC

(57) ABSTRACT

A recording tape cartridge which includes a case, a reel including a hub accommodated in the case, a locking member supported to be non-rotatable relative to the case and disposed within the hub, and a switching member disposed in the case. The hub is provided with an engaging portion therein. The locking member can attain a rotation-locking position, at which the locking member engages with the engaging portion and fills a gap between the reel and the case in an axial direction of the reel, and a rotation-enabling position, at which the state of engagement with the engaging portion is released and the locking member being withdrawn from the gap. The switching member retains the locking member at the rotation-locking position at times of non-use of the recording tape, and moves the locking member to the rotation-enabling position when operated in a predetermined direction by a drive device.

19 Claims, 6 Drawing Sheets

RECORDING TAPE CARTRIDGE

CROSS-REFERENCE TO RELATED APPLICATION

This application claims priority under 35 USC 119 from Japanese Patent Application No.2003-285127, the disclosure of which is incorporated by reference herein.

BACKGROUND OF THE INVENTION

1. Field of the Invention

The present invention relates to a recording tape cartridge which rotatably accommodates a reel onto which recording tape, such as a magnetic tape or the like, is wound.

2. Description of the Related Art

Recording tapes such as magnetic tapes and the like are used as external recording media for computers and the like. "One-reel" recording tape cartridges, which rotatably accommodate a single reel around which a recording tape is wound, require little space when stored and can record large amounts of information, and are employed as such recording tapes.

Such a recording tape cartridge is equipped with a brake mechanism such that the reel does not rotate in the case at times of non-use of the recording tape cartridge (see, for example, Japanese Patent Application Laid-Open (JP-A) No. 63-251983). JP-A No. 63-251983 discloses a structure in which a reel hub, which is formed in a cylindrical tube shape with a base, and which structures an axially central portion of a reel is provided with an engaging gear formed in an annular form at a bottom face of the reel hub, and a disk-shaped locking which member is provided with a braking gear which is meshable with the engaging gear being inserted in the reel hub. The locking member is supported to be non-rotatable with respect to the case but slidable in an axial direction of the reel. The braking gear of the locking member can mesh with the engaging gear of the reel by urging force of a compression coil spring which is provided between the locking member and the case. In this state, the reel is pressed against a bottom plate of the case by the urging force of the compression coil spring, and the braking gear is meshed with the engaging gear by the urging force. Thus, rotation of the reel relative to the case is locked.

In this structure, a through-hole is formed in a base portion of the reel hub. A release portion of a drive device advances in through this through-hole and pushes up the locking member against the urging force of the compression coil spring. Accordingly, the state of meshing of the braking gear with the engaging gear is released. As a result, rotation of the reel relative to the case is enabled (permitted). The release portion of the drive device is provided at a rotating shaft, together with a driving gear which meshes with a reel gear formed at an end face of the reel hub. The release portion pushes up the locking member in accordance with an operation of meshing the driving gear with the reel gear. As a result, when the rotating shaft drives to rotate the reel, the locking member, which is non-rotatable with respect to the case, and the release portion, which rotates integrally with the rotating shaft, slidingly contact one another while being pushed against each other by the urging force of the compression coil spring. Thus, in order to reduce rotational resistance which is generated in accordance with this sliding contact, the locking member and the release portion are both formed by resin materials.

Further, structures have been devised in which a release member, between a locking member and a base portion of a reel hub, rotates integrally with the reel (see, for example, the specification of Japanese Patent No. 3,187,022). Specifically, the release member is pushed by a release portion of a drive device and, together with the locking member, is pushed up against urging force of a compression coil spring. Thus, the locking member is pushed up to the release portion via the release member, and releases a locked state of the reel. Hence, with this structure, when the reel is driven to rotate, the release member rotates integrally with the reel. Therefore, rather than the release portion slidingly contacting the release member, the release member and the locking member slidingly contact one another.

However, structures are known in which locking members do not slide-contact other components at times of driving for rotation of a reel (see, for example, JP-A No. 11-25648). In such a structure, an engaging gear is formed at an outer peripheral portion of a flange of the reel. Two locking members, which are supported to be rotatable in the case and are urged in a direction of meshing with an engaging gear, mesh with the engaging gear and hence lock rotation of the reel. When such a recording tape cartridge is loaded at a drive device, the locking members are pushed by respective engaging portions of the drive device and are rotated against the urging force. Thus, the meshing of the locking members with the engaging gear is released and rotation of the reel is enabled. These release portions are provided respectively separately from a rotating shaft, and push the locking members in accordance with loading of the recording tape cartridge (the case) into the drive device or an operation of lowering the cartridge. Further, at this structure, a compression coil spring for pushing the reel against the case and/or the rotating shaft is coupled with the reel via a bearing, such that relative rotation of the compression coil spring with respect to the reel is absorbed by the bearing.

However, with the structures described in JP-A No. 63-251983 and the specification of Japanese Patent No. 3,187,022, the urging force of the compression coil spring acts as a drag at a region of sliding contact between the locking member and the release member or the release portion of the drive device. Therefore, if, in correspondence with an increase in recording capacity, the recording tape is lengthened and a rotation speed of the reel is increased and/or a duration of continuous driving is lengthened, the occurrence of abrasion at the sliding contact region will be a matter of concern. Further, in the structure described in JP-A No. 11-25648, an urging mechanism which urges the locking member in the direction of meshing with the engaging gear is a separate component from a compression coil spring which urges the reel toward a bottom plate of the case. Therefore, relative rotation of the reel and the compression coil spring cannot be absorbed by the locking member rotating relative to the reel. Accordingly, it is necessary to absorb such relative rotation with a costly bearing.

Further, the recording tape cartridges relating to the structures described above are structures in which, at times of non-use of the recording tape, the reel is pressed against the bottom plate of the case by the urging force of the compression coil spring. Therefore, it is not possible to obstruct (lock) vertical movement of the reel within the case when a force opposing the urging force of the compression coil spring acts thereon. Consequently, if, for example, a portion of the reel at which the reel gear is formed and which is exposed from the case (an outer face of the base portion of the reel hub) is pushed against or is subjected to an impact due to falling, the reel moves very loosely in the case, which leads to damaging the recording tape, whose one end portion is retained in the case by means of a leader member.

Thus, consequent to the provision in conventional recording tape cartridges of compression coil springs which urge reels relative to cases directly or via locking members, various problems have occurred.

SUMMARY OF THE INVENTION

In consideration of the circumstances described above, an object of the present invention is to provide a recording tape cartridge in which provision of an urging mechanism for urging a reel or a locking member relative to a case is not necessary.

A first aspect of the present invention provides a recording tape cartridge which can be loaded at a drive device, the recording tape cartridge including: a case; a reel rotatably accommodated in the case, the reel including a hub formed in a tubular shape, and a recording tape being wound around an outer peripheral portion of the hub; an inward tooth gear disposed coaxially at an inner side of the hub, the inward tooth gear ordinarily rotating integrally with the reel; a locking member supported to be non-rotatable with respect to the case and disposed within the hub, the locking member being capable, by movement in a radial direction of the hub, of attaining a rotation-locking position, for locking rotation of the reel by meshing with the inward tooth gear, and a release position, for releasing said meshing and enabling rotation of the reel; an operable member disposed within the hub, which reciprocatingly moves along an axial direction of the reel in correspondence with an operation mechanism of the drive device; and a positive motion cam mechanism including a cam portion, which is disposed at either one of the locking member and the operable member and is inclined with respect to the axial direction of the reel, and a contact member, which is disposed at the other of the locking member and the operable member and slidably contacts the cam portion, the positive motion cam mechanism causing the locking member to move between the rotation-locking position and the release position in accordance with the reciprocating movement of the operable member.

With the recording tape cartridge described above, for example, when in non-use of the recording tape cartridge, the locking member which is non-rotatable relative to the case is disposed at the rotation-locking position at which the locking member meshes with the inward tooth gear of the reel, and rotation of the reel relative to the case is blocked. In contrast, when the recording tape cartridge is loaded at a drive device and the operable member is operated to one side in the reel axial direction, the cam portion which is angled with respect to the reel axial direction slides against the contact member and a force of movement of the operable member is converted to a force of movement of the locking member in a radial inward direction of the reel. Thus, the locking member moves to a rotation-enabling position, at which the meshing with the inward tooth gear is released. As a result, rotation of the reel relative to the case is enabled. Further, when, from this rotation-enabled state, the operable member is operated to the other side in the reel axial direction, the cam portion slides against the contact member, and a force of movement of the operable member is converted to a force of movement of the locking member in a radial outward direction of the reel. Thus, the locking member moves to the rotation-locking position. As a result, rotation of the reel relative to the case is blocked again.

Here, because the positive motion cam mechanism is provided between the locking member and the operable member, the locking member can be moved between the rotation-locking position and the rotation-enabling position in correspondence with the directions of operation of the operable member. Consequently, it is possible to realize the function of blocking rotation of the reel at times of non-use without providing an urging mechanism for urging the locking member to the rotation-locking position side thereof.

Thus, in the first aspect, it is not necessary to provide an urging mechanism which urges the locking member with respect to the case. Therefore, even if the operable member is structured so as to slidingly contacts a rotation shaft of a drive device at times of driving to rotate the reel, because no urging force is acting on a region of this sliding contact, abrasion of the rotation shaft and/or the operable member can be prevented or greatly reduced.

It is desirable to provide a retaining mechanism for retaining the locking member at the rotation-locking position at usual times, a retaining state of which can be released at times of use. Such a retaining mechanism could, for example, retain the locking member at the rotation-locking position simply by static friction, and could be a structure which is operated separately from the operable member to move toward to and away from the locking member that is disposed at the rotation-locking position.

In the first aspect, the locking member may include a stopper portion which, when the locking member is disposed at the rotation-locking position, fills a gap between the reel and the case in the reel axial direction, and when the locking member is disposed at the release position, is withdrawn from the gap.

In the recording tape cartridge described above, the stopper portion of the locking member that is disposed at the rotation-locking position is inserted into the reel axial direction gap between the case and the reel, thus filling the gap and limiting movement of the reel in the reel axial direction. When the locking member moves to the rotation-enabling position, the stopping member is taken out from the reel axial direction gap between the case and the reel, and lifting (axial direction movement) of the reel relative to the case is enabled. Hence, the reel is taken out of contact with the case and made rotatable relative to the case.

Consequently, with this recording tape cartridge, it is possible to prevent or suppress looseness of the reel in the case at times of non-use, without providing an urging mechanism for pressing the reel against the case. Therefore, it is not necessary to provide a costly bearing or the like in order to absorb relative rotation of the reel and an urging member.

Further, in the first aspect, the locking member may include an abutting portion facing toward an axis of the reel, and the operable member includes a retaining portion which abuts against or is near to the abutting portion when the locking member is disposed at the rotation-locking position, and which moves away from the abutting portion in the reel axial direction in accordance with an operation in which the operable member moves in a direction for moving the locking member toward the release position.

When the locking member is disposed at the rotation-locking position, the retaining portion provided at the operable member abuts against or is near to the abutting portion which is oriented to the reel axis side of the locking member. Here, "near" means that a distance between the retaining portion and the abutting portion is smaller than a stroke for releasing the meshing of the inward tooth gear with the locking member, or is both smaller than that stroke and smaller than a stroke for withdrawing the stopper portion of the locking member from the gap between the reel and the case.

On the other hand, when the operable member is operated in the direction for moving the locking member toward the release position and moves in the reel axial direction, the retaining portion provided at the operable member is separated (offset) in the axial direction from the abutting portion of the locking member, which does not move in the reel axial direction. As a result, the locking member can move toward the axial center of the reel, and the locking member is moved to the release position by the operation of the positive motion cam mechanism in accordance with the operation of the operable member. Furthermore, when the operable member is operated to return the locking member to the rotation-locking position, the operable member also returns to the state in which the retaining portion abuts against or is near to the abutting portion.

Therefore, with this recording tape cartridge, it is possible to reliably prevent rotation of the reel relative to the case at times of non-use, or to prevent both such rotation and looseness of the reel in the case. Moreover, because the retaining portion which, interlockingly with operations of the operable member, implements retention of the locking member at the rotation-locking position and release of this retention is provided, structure of the cartridge is simple and has high reliability, and structure of a drive device is also kept simple.

Further again, in the first aspect, a plurality of the locking member may be provided, and the positive motion cam mechanism is disposed respectively between the plurality of locking members and the operable member.

Because the locking member which moves in the radial direction of the hub towards the inward tooth gear, which is coaxially provided at the inner side of the hub of the reel, and meshes therewith is plurally provided, radial direction movement of the reel is limited by the plurality of locking members disposed at the respective rotation-locking positions thereof. Therefore, undesired release of the locked state of the reel due to looseness in the radial direction of the reel is prevented.

Furthermore, because the positive motion cam mechanism is provided respectively between the plurality of locking members and the single operable member, the single operable member is operated by the drive device to move the plurality of locking members between the rotation-locking positions and the rotation-enabling positions. Therefore, the number of components is small, and structure of the drive device is not made more complicated. Note that, it is preferable if the operable member in this structure is provided at an axially central portion of the hub.

A second aspect of the present invention provides a recording tape cartridge which can be loaded at a drive device, the recording tape cartridge including: a case; a reel accommodated in the case, the reel including a tubular hub around which a recording tape is wound at an outer peripheral portion thereof, and an engaging portion provided within the hub; a locking member supported to be non-rotatable with respect to the case and disposed within the hub, the locking member being capable of attaining a rotation-locking position, for engaging with the engaging portion and filling a gap between the case and the reel in an axial direction of the reel, and a rotation-enabling position, for releasing the state of engagement with the engaging portion and withdrawing the locking member from the gap; and a switching member disposed in the case, which retains the locking member at the rotation-locking position at times of non-use of the recording tape, moves the locking member to the rotation-enabling position when operated in a predetermined direction by the drive device, and moves the locking member to the rotation-locking position when operated in a direction opposite to the predetermined direction by the drive device.

In the recording tape cartridge described above, at times of non-use of the recording tape, the switching member retains the locking member at the rotation-locking position. Thus, the engaging portion of the reel is engaged with the locking member and rotation of the reel with respect to the case is blocked. Moreover, the gap in the reel axial direction between the reel and the case is filled by the locking member. Thus, movement of the reel in the axial direction is limited. On the other hand, when the recording tape cartridge is loaded at a drive device and the switching portion is operated in the predetermined direction, the locking member moves to the rotation-enabling position, the engagement with the engaging portion is released, and the locking member is taken out from the aforementioned gap. Thus, rotation of the reel relative to the case and lifting (axial direction movement) of the reel with respect to the case are enabled. Further, when, from the rotation-enabled state, the switching member is operated in the direction opposite to the predetermined direction, the locking member is returned to the rotation-locking position, and rotation of the reel relative to the case and lifting of the reel relative to the case are blocked.

Here, because the locking member can be moved between the rotation-locking position and the rotation-enabling position in correspondence with the directions of operation of the switching member, it is possible to realize the function of blocking rotation of the reel at times of non-use without providing an urging mechanism for urging the locking member to the rotation-locking position side thereof. Further, because the locking member that is retained at the rotation-locking position by the switching member fills the aforementioned gap between the case and the reel, looseness of the reel in the case at times of non-use is prevented or suppressed even without provision of an urging mechanism for pressing the reel against the case.

Thus, with the recording tape cartridge described above, it is not necessary to provide an urging mechanism which urges both the reel and the locking member relative to the case. Therefore, even if the switching member is a structure which slidingly contacts a rotation shaft of a drive device at times of driving to rotate the reel, because no urging force is acting on a region of this sliding contact, abrasion of the rotation shaft and/or the switching member can be prevented or greatly reduced. Moreover, it is not necessary to provide a costly bearing or the like in order to absorb relative rotation of the reel and an urging member.

Furthermore, a third aspect of the present invention provides a locking mechanism for locking rotation and enabling rotation of a reel in a recording tape cartridge which can be loaded at a drive device and which includes a case and the reel, the reel being rotatably accommodated in the case, including a hub around which recording tape is wound at an outer peripheral portion thereof, and an engaging portion provided within the hub, the locking mechanism comprising: a locking member supported to be non-rotatable with respect to the case and disposed within the hub, the locking member being capable of attaining a rotation-locking position, for engaging with the engaging portion and locking rotation of the reel, and a rotation-enabling position, for releasing the engagement with the engaging portion and enabling rotation of the reel; and a switching member disposed in the case, which retains the locking member at the rotation-locking position at times of non-use of the recording tape, moves the locking member to the rotation-enabling position when operated in a predetermined direction by the drive device, and moves the locking member to the rotation-locking position when operated in a direction opposite to the predetermined direction by the drive device.

Moreover, a fourth aspect of the present invention provides a recording tape cartridge which can be loaded at a drive device, the recording tape cartridge including: a case; a reel accommodated in the case, the reel including a tubular hub disposed at an axially central portion of the reel, and a recording tape being wound at an outer peripheral portion of the hub; a locking member disposed within the case, which is capable of attaining a locking position for at least locking movement of the reel in the axial direction of the reel within the case, and a lock-release position for permitting movement of the reel in the axial direction thereof; and a switching member disposed within the case, which is operated in a predetermined direction by the drive device for moving the locking member that is disposed at the locking position to the lock-release position.

A recording tape cartridge relating to the present invention as described above has an excellent effect in that it is not necessary to provide an urging mechanism for urging a reel and/or a locking member with respect to a case.

DETAILED DESCRIPTION OF THE INVENTION

A recording tape cartridge 10 relating to an embodiment of the present invention will be described with reference to FIGS. 1A to 6B.

Overall Structure of Recording Tape Cartridge

Figure 1A:
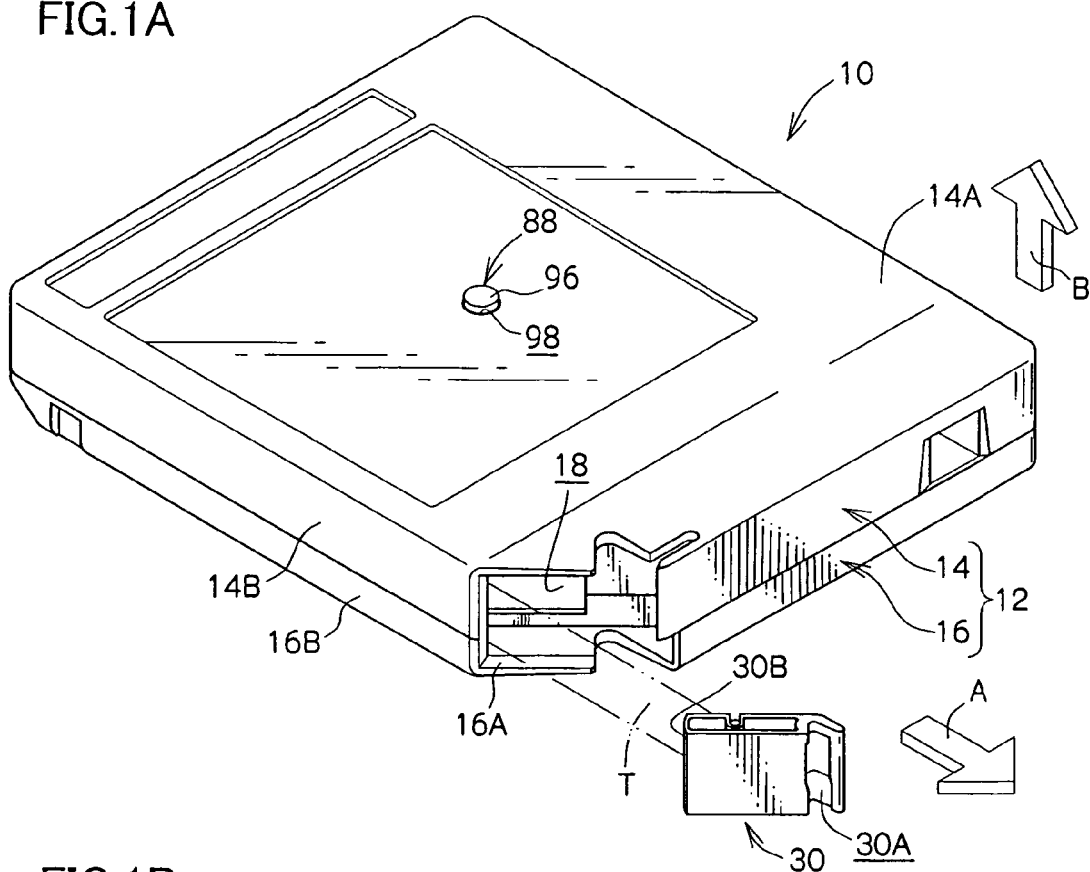
FIG. 1A is a perspective view, seen from above, showing the exterior of a recording tape cartridge relating to an embodiment of the present invention.
Figure 1B:
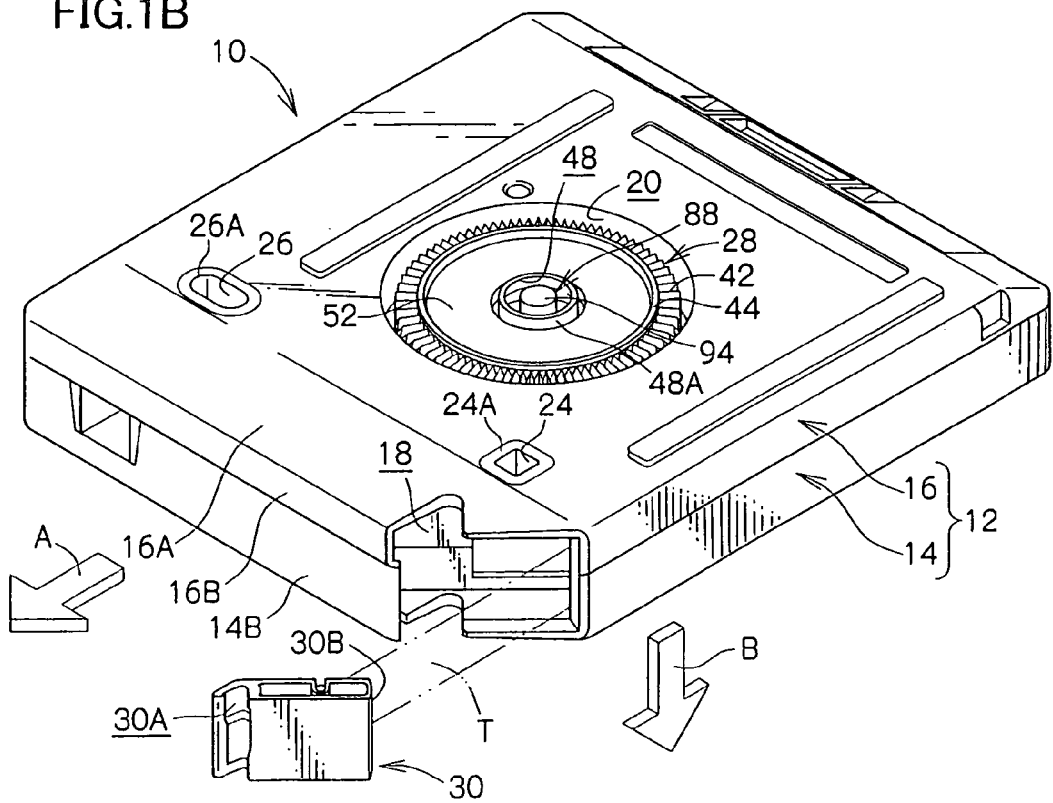
FIG. 1B is a perspective view, seen from below, showing the exterior of the recording tape cartridge relating to the embodiment of the present invention.
Figure 2:
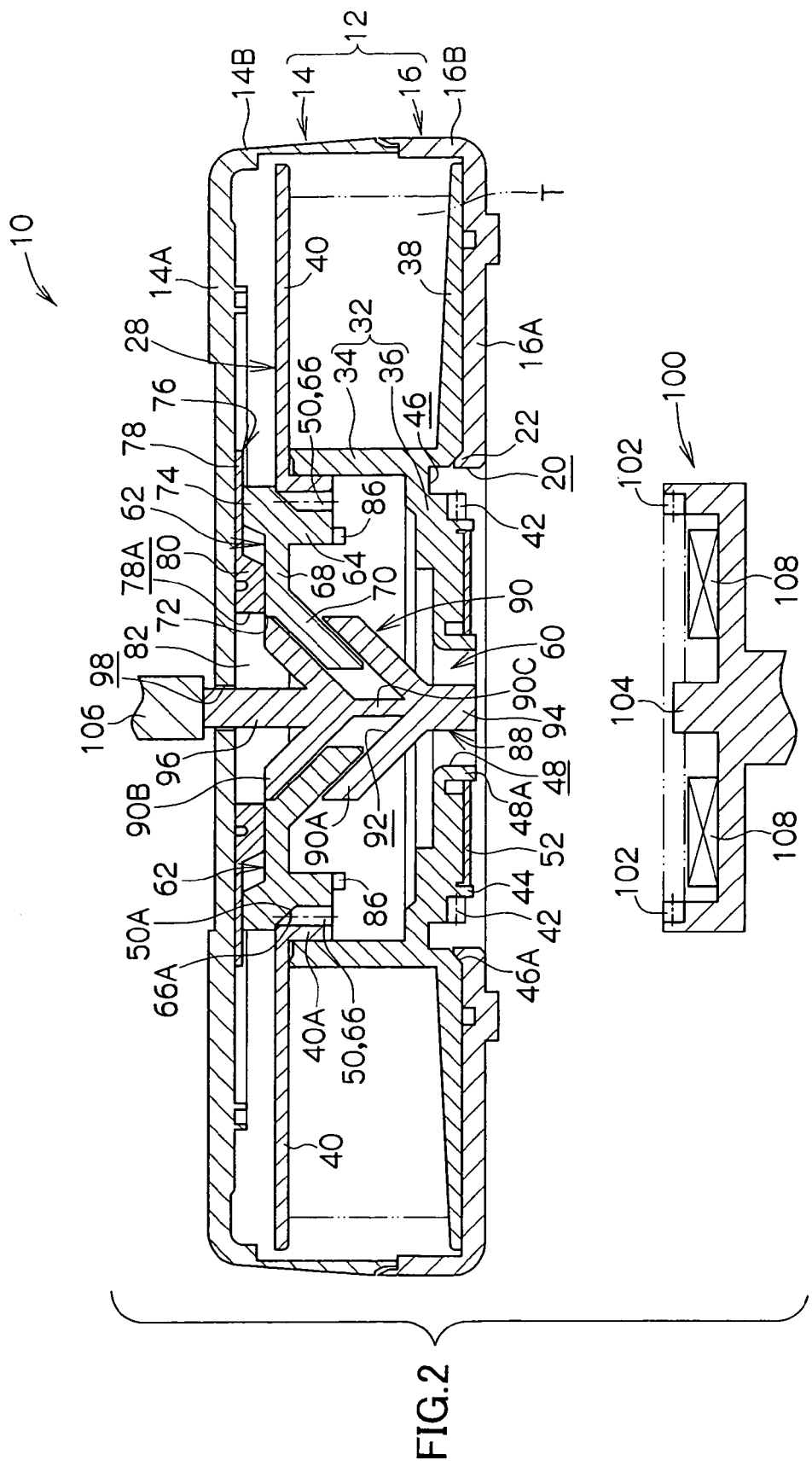
FIG. 2 is a sectional view showing a rotation-locked state of the reel of the recording tape cartridge relating to the embodiment of the present invention.

FIG. 1A shows the recording tape cartridge 10 as viewed from diagonally above, FIG. 1B shows the recording tape cartridge 10 as viewed from diagonally below, and FIG. 2 shows a sectional view of the recording tape cartridge 10. An arrow A, which is shown as appropriate in the drawings, indicates a loading direction of the recording tape cartridge 10 into a drive device and, for convenience of explanation, a side indicated by arrow A is regarded as a front side. Furthermore, the direction indicated by an arrow B is regarded as an upper side.

As shown in FIGS. 1A to 2, the recording tape cartridge 10 is provided with a case 12. The case 12 is structured by joining together an upper case 14 and a lower case 16. More specifically, the upper case 14 is structured with a substantially frame-like peripheral wall 14B provided standing along outer edges of a ceiling plate 14A which is substantially rectangular in plan view, and the lower case 16 is structured with a peripheral wall 16B provided standing along outer edges of a floor plate 16A with a form which substantially corresponds with the ceiling plate 14A. Thus, the case 12 is formed in a substantial box shape by, in a state in which the opening end of the peripheral wall 14B and the opening end of the peripheral wall 16B are matched up, joining the upper case 14 with the lower case 16 by ultrasonic welding, screw-fixing or the like.

At a corner portion of this case 12 which is at a leading side in the direction of loading into a drive device, the ceiling plate 14A, the peripheral wall 14B, the floor plate 16A and the peripheral wall 16B are each cut away to form an aperture 18, which is angled with respect to the loading direction. A circular gear aperture 20, which passes through the floor plate 16A, is formed at a substantially central portion of the floor plate 16A for exposure of a reel gear 42, which will be described later. At a portion of the floor plate 16A at an edge of the gear aperture 20, a tapered annular rib 22 is provided protruding toward the inner side of the case 12, for positioning of a reel 28, which will be described later.

A pair of positioning holes 24 and 26 is formed at a front end vicinity of an outer face of the floor plate 16A of the case 12. The two positioning holes 24 and 26 are provided in the form of pockets in protrusion portions (not shown), which are provided standing from the floor plate 16A to the inside of the case 12. The positioning holes 24 and 26 are disposed to be spaced from one another along an imaginary line which intersects the loading direction. The positioning hole 24, which is at the side closer to the aperture 18, is formed in a substantially square shape, in bottom plan view, which contacts the outside of a positioning pin (not shown) of a drive device. The positioning hole 26 is formed as a long hole with length along the aforementioned imaginary line and a width corresponding to the diameter of another positioning pin (not shown).

Accordingly, when the recording tape cartridge 10 is loaded in a drive device and the respective positioning pins are inserted into the positioning holes 24 and 26, the recording tape cartridge 10 will be accurately positioned in horizontal directions (left-right and front-rear directions) in the drive device.

Portions of the floor plate 16A around the positioning holes 24 and 26 are formed as reference surfaces 24A and 26A, which are finished more smoothly than other portions (which are design surfaces). When the positioning pins are inserted into the positioning holes 24 and 26, the positioning surfaces 24A and 26A abut against positioning surfaces of the drive device, which are provided around the positioning pins. Thus, the recording tape cartridge 10 is positioned in a vertical direction in the drive device.

As shown in FIG. 2, the reel 28, which is described below, is rotatably accommodated in the case 12 described above. Only one of the reel 28 is provided. A magnetic tape T, which serves as a recording tape, is wound on at the reel 28. A leader block 30, which serves as a drawing-out member, is attached to a distal end of the magnetic tape T.

Figure 3:
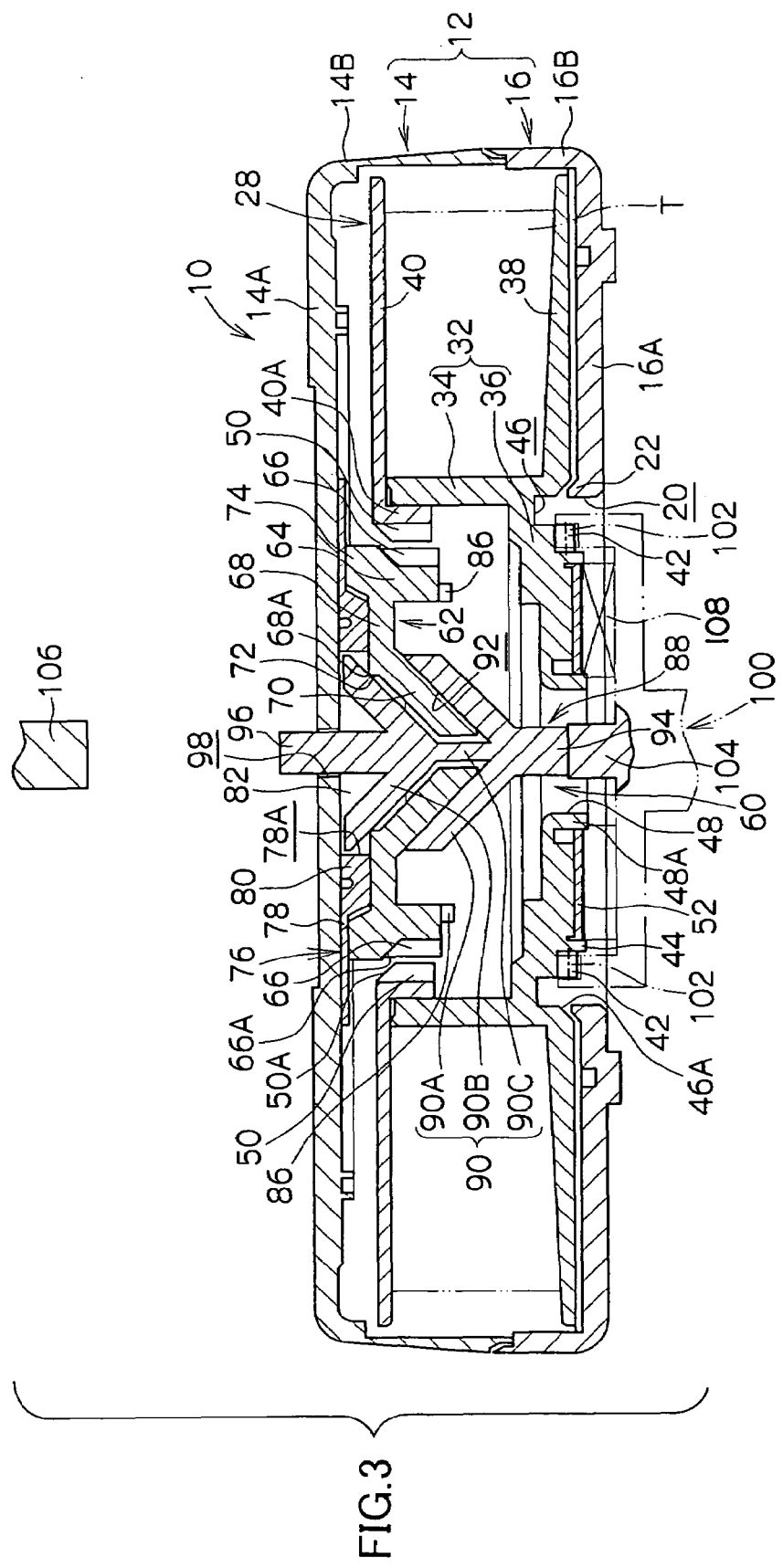
FIG. 3 is a sectional view showing a rotation-released state of the reel of the recording tape cartridge relating to the embodiment of the present invention.

When the recording tape cartridge 10 is not in use, the leader block 30 is accommodated and retained at an inner side of the aperture 18 of the case 12. In this state, the leader block 30 closes off the aperture 18, and ingression of dust or the like into the case 12 is blocked. An engaging recess portion 30A is formed at a distal end of the leader block 30. When the magnetic tape T is to be drawn out in a drive device, the leader block 30 is taken out from the case 12 by a drawing-out mechanism of the drive device, which engages with the engaging recess portion 30A, and is guided to a take-up reel of the drive device. An end face at a side of the leader block 30 which is opposite to a side thereof at which the engaging recess portion 30A is provided is formed as a circular arc wall 30B. The leader block 30 is fitted into the take-up reel, and structures a portion of a winding surface around which the magnetic tape T is to be wound. Structure of Reel and Associated Components As shown in FIGS. 2 and 3, the reel 28 is provided with a reel hub 32, which structures an axially central portion of the reel 28. The reel hub 32 is formed in a substantially circular tube shape having a base, which opens upward, including a tubular portion 34 and a base portion 36. The magnetic tape T is wound onto an outer peripheral surface of the tubular portion 34, and the base portion 36 closes off a lower portion of the tubular portion 34. A lower flange 38 is coaxially and integrally provided extending from a vicinity of a base portion 36 side end portion (lower end portion) of the reel hub 32 to an outer side in a radial direction of the reel hub 32. An upper flange 40 is joined to an upper end portion of the reel hub 32. Thus, at the reel 28, the magnetic tape T is wound around the outer peripheral surface of the tubular portion 34 of the reel hub 32, between opposing faces of the lower flange 38 and the upper flange 40, and the tubular portion 34 opens upward.

The reel gear 42 is provided at a lower end face of the base portion 36 of the reel hub 32 (an outer face which is disposed lower than the lower flange 38). The reel gear 42 is formed in an annular shape which is coaxial with the reel 28 as a whole. The reel gear 42 is meshable with a driving gear 102 (see FIG. 2), which is provided in an annular form at an outer peripheral portion of a distal end of a rotating shaft 100 of a drive device. The reel gear 42 is formed in an outward tooth gear form with tooth peaks which are oriented downward and whose inner ends in the radial direction of the reel 28 are joined by a rib 44.

An annular groove 46 is formed between this reel gear 42 and an outer peripheral portion of the base portion 36 (i.e., at a portion in the vicinity of an inner edge of the lower flange 38), in order to enable meshing of the reel gear 42 with the driving gear 102, which is formed in an inward tooth gear form. An outer side opening end portion of the annular groove 46 is formed as a taper surface 46A, which is formed in a tapered form corresponding to the annular rib 22 of the case 12. A through-hole 48 is formed at an axially central portion of the base portion 36. A rib 48A, which defines an edge portion of the through-hole 48, is provided protruding to the lower face side of the base portion 36.

An external diameter of the upper flange 40 is set to be the same as an external diameter of the lower flange 38. A short tubular portion 40A, with an external diameter corresponding to an internal diameter of the tubular portion 34, is provided at an axially central portion of the upper flange 40. In a state in which the short tubular portion 40A is fitted in at an upper end vicinity of the tubular portion 34, the short tubular portion 40A is coaxially fixed to the reel hub 32 by ultrasonic welding.

Figure 4:
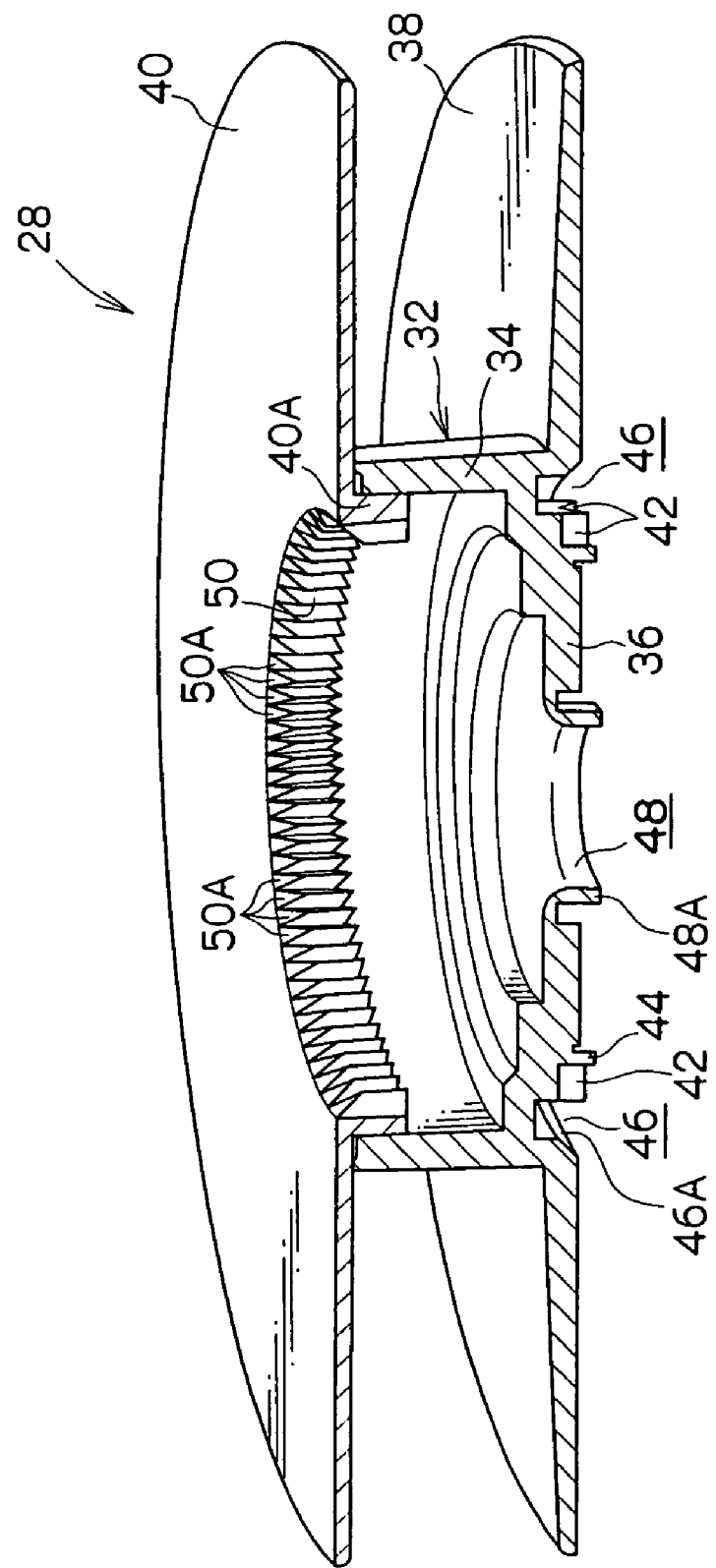
FIG. 4 is a perspective view of the reel structuring the recording tape cartridge relating to the embodiment of the present invention, seen in cross-section.

As shown in FIG. 4, an engaging gear 50 is formed integrally at an inner peripheral portion of the short tubular portion 40A of the upper flange 40, to serve as an engaging portion and an inward tooth gear. The engaging gear 50 is an inward tooth gear, whose tooth peaks of each teeth are oriented toward the axial center of the reel 28. Upper portions (tooth width direction end portions) of the teeth are formed as angled portions 50A, which are inclined, with respect to the axial direction of the reel 28, from the tooth peaks to bases of the teeth.

At the reel 28 described above, the reel hub 32, which includes the reel gear 42 and so forth, and the lower flange 38 are formed integrally by resin-molding. The upper flange 40, which includes the short tubular portion 40A at which the engaging gear 50 is formed, is also formed by resin-molding. Further, at the lower face of the base portion 36 of the reel hub 32, a reel plate 52, which is formed of a magnetic material in an annular shape, is coaxially and integrally provided between the rib 44 and the rib 48A by insert-molding. The reel plate 52 is used for attraction and retention (chucking) by a magnet 108, which is provided at a radial direction inner side of the driving gear 102 of the rotating shaft 100.

This reel 28 is accommodated in the case 12 and is placed on the floor plate 16A at times of nonuse. Specifically, as shown in FIG. 2, principally the lower flange 38 of the reel 28 abuts against the inner side of the floor plate 16A, and in this state, the annular rib 22 is inserted into the annular groove 46 and abutted against (fitted to) the taper surface 46A. Thus, movement of the reel 28 in the radial direction is restricted.

In this state, the reel 28 is disposed inside the case 12 overall, and the reel gear 42 and the reel plate 52 are exposed through the gear aperture 20 (see FIG. 1B). That is, the reel gear 42 faces outside the case 12 through the gear aperture 20 without protruding from the outer face (lower face) of the floor plate 16A. Therefore, operation of the reel 28, which is to say chucking (retention) and driving for rotation thereof, from outside the case 12 is enabled.

Structure of Locking Mechanism

As shown in FIGS. 2 and 3, a locking mechanism 60 is provided at the recording tape cartridge 10. At times of nonuse of the magnetic tape T, the locking mechanism 60 limits axial direction movement of the reel 28 and blocks rotation of the reel 28 relative to the case 12. In a state in which the recording tape cartridge 10 is loaded at a drive device, the locking mechanism 60 enables lifting and rotation of the reel 28 with respect to the case 12. Structure of the locking mechanism 60 will be described in detail below.

Figure 5:
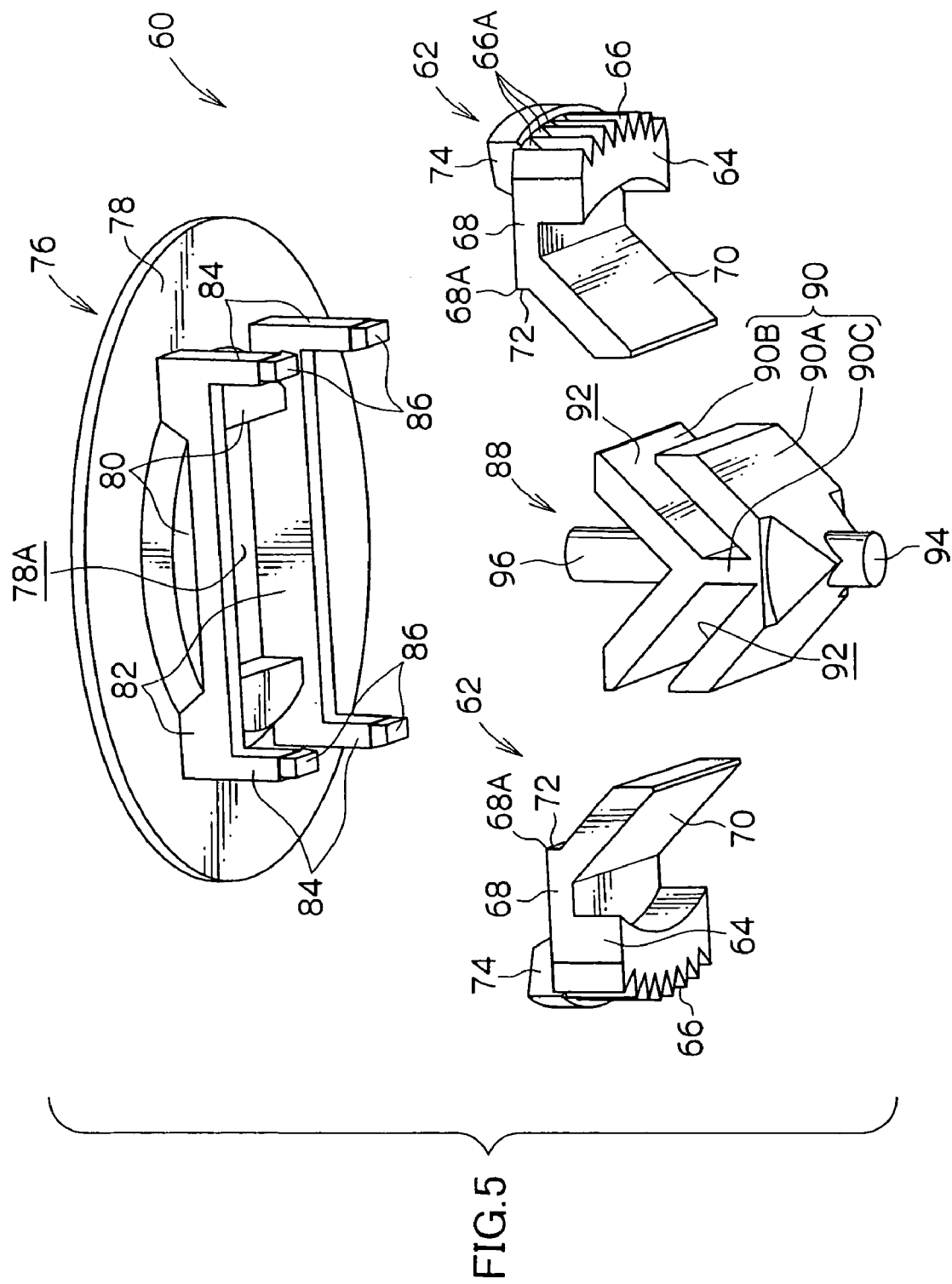
FIG. 5 is an exploded perspective view of a locking mechanism structuring the recording tape cartridge relating to the embodiment of the present invention.

As shown in FIG. 5, the locking mechanism 60 is provided with a reel-locking member 62, which serves as a locking member. A plurality (two in the present embodiment) of the reel-locking member 62 is provided. The reel-locking members 62 are disposed symmetrically with respect to the axial center of the reel 28, and are made capable of moving in the radial direction of the reel 28 and meshing with the engaging gear 50.

Specifically, the reel-locking member 62 is provided with a main body portion 64 in the form of a circular arc block, which corresponds with the short tubular portion 40A of the upper flange 40. A brake gear 66 is formed at a convex face of an outer peripheral side of the main body portion 64. The brake gear 66 is formed as an outward tooth gear which is meshable with the engaging gear 50. As shown in the cutaway portion of FIG. 6B, upper portions (end portions in the tooth width direction) of the teeth of the brake gear 66 are joined by angled portions 66A, which are inclined from tooth peaks to tooth bases of the teeth to correspond with the angled portions 50A of the engaging gear 50. Peak portions of tooth peaks of the teeth of this brake gear 66 and of the teeth of the engaging gear 50 are respectively formed in substantially acute triangular forms in plan view (forms which are tapered at both sides) so as to be reliably meshed by the reel-locking member 62 moving in the radial direction of the reel 28.

Figure 6A:
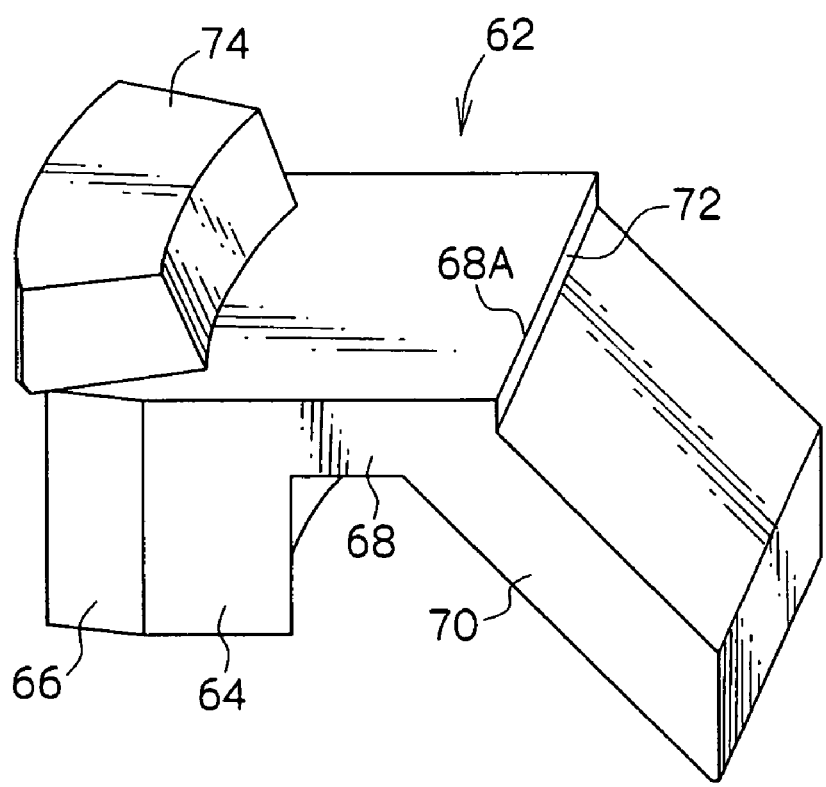
FIG. 6A is a perspective view, seen from above, of a reel-locking member of the locking mechanism structuring the recording tape cartridge relating to the embodiment of the present invention.
Figure 6B:
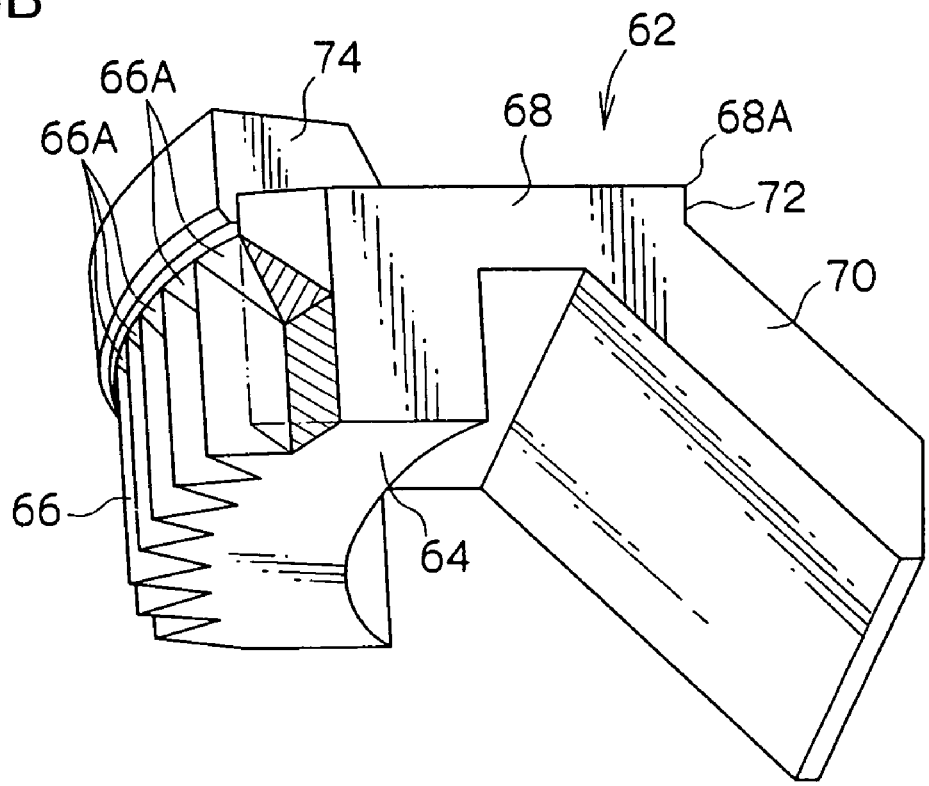
FIG. 6B is a perspective view, seen from below, of the reel-locking member of the locking mechanism structuring the recording tape cartridge relating to the embodiment of the present invention.

As shown in FIG. 6A, an upper side guide portion 68, with the form of a rectangular flat plate, is provided extending along an upper end plane of the main body portion 64 from a concave face at an inner peripheral side of the main body portion 64. Faces of the main body portion 64 and the upper side guide portion 68, which are flush with one another, are formed as flat surfaces along a plane perpendicular to the axis of the reel 28. A inverted cam portion 70, with the form of a rectangular flat plate, is provided extending from a side of the upper side guide portion 68 that is opposite to the side thereof at which the main body portion 64 is provided. The inverted cam portion 70 is angled downward toward the axial center of the reel 28. A step portion 72 is formed, to serve as an abutting portion, at an upper portion of a boundary portion between the upper side guide portion 68 and the inverted cam portion 70.

A stopper portion 74 is provided protruding from an upper side of the main body portion 64. The stopper portion 74 is formed in a circular arc block form similar to the main body portion 64, and a convex face at the outer peripheral side of the stopper portion 74 protrudes slightly outward (to the outer side in the radial direction of the reel 28) relative to the tooth peaks of the brake gear 66. A concave face at the inner peripheral side of the stopper portion 74 is formed as a tapered surface whose arc radius is smaller at a lower end (the main body portion 64 side) thereof. An upper face of the stopper portion 74 is formed to be parallel with the upper face of the main body portion 64 and the upper side guide portion 68.

At this reel-locking member 62, the main body portion 64, the upper side guide portion 68 and the inverted cam portion 70 are formed with respectively equal widths and respective width direction end faces thereof being flush. The stopper portion 74 has dimensions so as not to protrude beyond the width direction end faces of the main body portion 64 in the width direction. The main body portion 64 (and the brake gear 66), the upper side guide portion 68, the inverted cam portion 70 and the stopper portion 74 of the reel-locking member 62 are formed integrally by resin-molding.

The reel-locking members 62 as described above are supported by a support member 76 so as to be movable in the radial direction of the reel 28 relative to the case 12. The support member 76 is provided with a disk plate portion 78, which is formed in a substantially disk plate form. This disk plate portion 78 is welded or adhered to the ceiling plate 14A in a state in which an upper face of the disk plate portion 78 abuts against an inner face of the ceiling plate 14A. Accordingly, this support member 76 is a structure which is fixed so as to be substantially coaxial with the reel 28 in the case 12.

A rectangular through-hole 78A is formed at a central portion of the disk plate portion 78. The through-hole 78A enables movement of a clutch member 88, which is described later. Guide protrusion portions 80 are provided protruding from a lower face of the disk plate portion 78. Inner edges of the guide protrusion portions 80 correspond with inner edges of the through-hole 78A, and outer edges of the guide protrusion portions 80 have circular forms. A protrusion height of the guide protrusion portions 80 from the lower face of the disk plate portion 78 corresponds to a height of the stopper portions 74 of the reel-locking members 62. Outer peripheral faces of the guide protrusion portions 80 are formed as tapering surfaces which correspond with the concave surfaces at the inner peripheral sides of the stopper portions 74 of the reel-locking members 62.

A pair of guide walls 82 is provided standing from the lower face of the disk plate portion 78. The guide walls 82 are formed in rectangular plate forms which face one another, with a facing distance therebetween corresponding to the width of the reel-locking members 62 (i.e., of the main body portions 64 and the upper side guide portions 68). The mutually facing surfaces of the guide walls 82 are made flush with two inner edges of the through-hole 78A that are parallel therewith, and the guide walls 82 are provided so as to straddle the respective guide protrusion portions 80. Furthermore, the guide walls 82 protrude downward further than the guide protrusion portions 80, and a height from lower ends of the guide walls 82 to lower faces of the guide protrusion portions 80 corresponds to a height (i.e., thickness) of the upper side guide portions 68 of the reel-locking members 62.

Leg portions 84 are provided protruding downward from respective length direction end portions of the guide walls 82. Engaging protrusion portions 86 are provided at lower ends of the leg portions 84. Each engaging protrusion portion 86 protrudes toward the guide wall 82 other than the guide wall 82 at which that engaging protrusion portion 86 is provided. A height from upper faces of the engaging protrusion portions 86 to the lower face of the disk plate portion 78 corresponds to a height from the lower faces of the main body portions 64 of the reel-locking members 62 to the upper faces of the stopper portions 74. Further, a height from upper faces of the engaging protrusion portions 86 to lower faces of the guide protrusion portions 80 corresponds to a height of the main body portions 64 of the reel-locking members 62 (i.e., a height from a lower face of the main body portion 64 to the upper face of the upper side guide portion 68).

The various portions of this support member 76 are structured of resin material and are formed as an integral whole by resin-molding, or alternatively, are structured by forming the guide protrusion portions 80 integrally at the disk plate portion 78, forming the guide walls 82 as separate components, and attaching the guide walls 82 to the disk plate portion 78.

The reel-locking members 62 (i.e., upper portions of the main body portions 64, and the upper side guide portions 68 and the stopper portions 74) are slidably inserted into the support member 76 described above, between the pair of guide walls 82, such that the stopper portions 74 are disposed at radial direction outer sides of the guide protrusion portions 80 and the brake gears 66 are oriented to the radial direction outer sides. In this state, the engaging protrusion portions 86 slidably abut against lower sides of the main body portions 64 at respective width direction sides of the main body portions 64. Thus, the reel-locking members 62 are prevented from falling out from the support member 76. In the same state, the upper faces of the upper side guide portions 68 of the reel-locking members 62 slidably and loosely contact the lower faces of the guide protrusion portions 80 of the support member 76, and the stopper portions 74 slidably and loosely contact the lower faces of the disk plate portion 78.

Therefore, movement of the reel-locking members 62 in the width direction thereof is restricted by the pair of guide walls 82, and vertical direction movement and rotation of the reel-locking members 62 (changes in attitudes thereof at times of operation of the clutch member 88) are prevented by the guide protrusion portions 80, the disk plate portion 78 and the engaging protrusion portions 86. That is, the reel-locking members 62 are structures which are guided in the length direction of the pair of guide walls 82 and are permitted only to move reciprocatingly in a common diametric direction of the reel 28.

Thus, each reel-locking member 62 is capable of attaining a rotation-locking position, at which the brake gear 66 is meshed with the engaging gear 50 of the reel 28 (see FIG. 2), and a rotation-enabling position, which is a release position at which this meshing is released (see FIG. 3), by reciprocating movements in the radial direction of the reel 28. When the reel-locking members 62 are disposed at the rotation-locking positions, the angled portions 66A of each brake gear 66 are abutted against or brought very near to the angled portions 50A of the engaging gear 50.

Further, when the reel-locking members 62 are positioned at the rotation-locking positions, the distal end portions of the stopper portions 74 that protrude beyond the tooth peaks of the brake gears 66 are abutted against or brought very near to an upper face of the upper flange 40 of the reel 28. Thus, with this structure, a gap, in the reel axial direction, between the reel 28 that is placed on the floor plate 16A and the disk plate portion 78 that is fixed to the ceiling plate 14A is filled by the stopper portion 74. In contrast, when the reel-locking members 62 are positioned at the rotation-enabling positions, the distal end portions of the stopper portion 74 that protrude beyond the tooth peaks of the brake gear 66 are withdrawn from this gap, and lifting of the reel 28 within the case 12 is enabled.

Note that the engaging protrusion portions 86 are provided so as to be in contact with the lower faces of the main body portions 64 and support the reel-locking members 62 at all stages of reciprocating movements of the reel-locking members 62 between the rotation-locking positions and the rotation-enabling positions.

The locking mechanism 60 is further provided with the clutch member 88, which serves as a switching member or operable member for reciprocatingly moving the reel-locking members 62 between the rotation-locking positions and the rotation-enabling positions. This clutch member 88 is provided with a cam portion 90. The cam portion 90 is structured by an upward pushing portion 90A, a downward pushing portion 90B and a connecting piece 90C. The upward pushing portion 90A is formed in a "V" shape to correspond with the respective inverted cam portions 70 of the reel-locking members 62, which are disposed on a straight line in the radial direction of the reel 28. The downward pushing portion 90B is similarly formed in a "V" shape and is disposed to be substantially parallel with the upper side of the upward pushing portion 90A. The connecting piece 90C connects an inner side of a vertex portion of the upward pushing portion 90A with a vertex portion of the downward pushing portion 90B.

Thus, two cam grooves 92 are formed at the cam portion 90. The cam grooves 92 are each inclined relative to the axis of the reel 28 and are axially symmetrical with one another with respect to the axis. A groove width of the cam grooves 92 corresponds to a distance from an upper end of the step portion 72 of the reel-locking member 62 to a lower face of the inverted cam portion 70. The cam portion 90 is formed with a rectangular shape in plan view with substantially the same width as the reel-locking members 62 and is capable of passing through the through-hole 78A of the support member 76.

Further, both of distal ends of the upward pushing portion 90A, whose upper face defines the cam grooves 92, are terminated by surfaces which are cut along the vertical direction to limit a length dimension of the upward pushing portion 90A, which is perpendicular to a width direction thereof. Meanwhile, both of distal ends of the downward pushing portion 90B, whose lower face also defines the cam grooves 92, are terminated by surfaces which are cut along the horizontal direction so as to limit a vertical direction dimension of the downward pushing portion 90B and assure a stroke of movement in the vertical direction. Edge portions of the respective distal ends of the upward pushing portion 90A and the downward pushing portion 90B are each rounded off or chamfered as appropriate.

A release operation portion 94 is provided protruding downward from the vertex portion of the upward pushing portion 90A (a lower end portion of the cam portion 90). The release operation portion 94 is formed in a short cylindrical shape. A vertex portion vicinity of the upward pushing portion 90A, at which the release operation portion 94 is provided, is narrowed in the width direction so as not to interfere with hole edges of the through-hole 48 of the reel 28. Further, a lock operation portion 96 is provided protruding upward from an inner side of the vertex portion of the downward pushing portion 90B. The lock operation portion 96 is formed in a cylindrical shape.

The clutch member 88 described above is integrally formed as a whole by resin-molding. Hence, the clutch member 88 is disposed at an axially central portion of the reel 28 in a state in which the inverted cam portions 70 of the reel-locking members 62 are inserted into respectively different ones of the cam grooves 92. Thus, the clutch member 88 is supported so as to be non-rotatable relative to the case 12 and incapable of falling out from the case 12.

As shown in FIG. 2, in the state in which the reel-locking members 62 are disposed at the rotation-locking positions, the two distal ends of the downward pushing portion 90B of the cam portion 90 are engaged with the step portions 72 of respectively different ones of the reel-locking members 62. Thus, at the locking mechanism 60, the reel-locking members 62 are structures of which movement to the reel 28 axial center sides thereof (toward the rotation-enabling positions thereof) is blocked and are retained at the rotation-locking positions. In this state, the inverted cam portions 70 of the reel-locking members 62 are slightly separated from lower edges of the cam grooves 92 (i.e., the upper face of the upward pushing portion 90A). Moreover, in this state, as shown in FIG. 1, the release operation portion 94 is exposed to outside the case 12 (the gear aperture 20) through the through-hole 48 of the reel 28. Additionally, the lock operation portion 96 passes through a through-hole 98 which is formed in the ceiling plate 14A, and is slightly exposed to the outside of the case 12.

Further, in this rotation-locked state, since the stopper portions 74 of the reel-locking members 62 fill the gap between the upper flange 40 and the disk plate portion 78 (the ceiling plate 14A I the axial direction of the reel). Therefore, with this structure, even if the base portion 36 of the reel 28 is pushed, movement of the reel 28 toward the axial direction upper side is limited. Further yet, even if the stopper portions 74 were not filling the above-mentioned gap (e.g., if the stopper portions 74 were not provided), if the reel 28 were to be pushed up toward the upper side thereof, the angled portions 50A of the reel 28 would abut against the angled portions 66A of the reel-locking members 62. Therefore, the reel 28 cannot be moved upward without moving the reel-locking members 62 towards the rotation-enabling positions thereof, in regard to which, as described above, the reel-locking members 62 are retained at the rotation-locking positions. In conclusion therefore, the reel 28 is a structure which cannot be pushed upward. Moreover, even if the downward pushing portion 90B of the clutch member 88 were not inserted between the step portions 72 and the reel-locking members 62 were not retained at the rotation-locking positions, the reel-locking members 62 could not be moved toward the rotation-enabling positions thereof without overcoming frictional force between the reel-locking members 62 and the support member 76 or the clutch member 88, which is caused by a radial direction force which is converted from a portion of an upward pushing force at the angled portions 50A and 66A (a component force of an upward pushing). Therefore, the reel 28 is a structure which cannot be pushed up easily.

The locking mechanism 60 is a structure at which, when the release operation portion 94 is pushed upward in the rotation-locked state, the reel-locking members 62 move to the rotation-enabling positions. More specifically, when the clutch member 88 is pushed up until lower edges of the cam grooves 92 abut against the inverted cam portions 70, the distal ends of the downward pushing portion 90B are taken out from between the step portions 72. Thus, the state of retention of the reel-locking members 62 is released. When the clutch member 88 is pushed up further in the reel 28 axial direction, the lower edges of the cam grooves 92, which are inclined with respect to the axis, slide against the inverted cam portions 70, and the upward pushing force of the clutch member 88 is converted to a force for moving the reel-locking members 62 in the reel 28 radial direction. Thus, this structure moves the reel-locking members 62 to the rotation-enabling positions.

As shown in FIG. 3, in the state in which the reel-locking members 62 are disposed at the rotation-locking positions, the inverted cam portions 70 are deeply inserted into the cam grooves 92, being disposed in the cam grooves 92 as far as the step portions 72 and edge portions 68A of the upper side guide portions 68. In this state, the taper surfaces of the stopper portions 74 may abut against the taper surfaces at the outer peripheries of the guide protrusion portions 80, to serve as structures blocking further movement of the reel-locking members 62 to the reel 28 axial center sides thereof.

Further, the locking mechanism 60 is a structure at which, when the lock operation portion 96 is pushed downward in this rotation-enabled state, the clutch member 88 is pushed down in the reel 28 axial direction, the upper edges of the cam grooves 92, which are inclined with respect to the axis, slide against the edge portions 68A, the downward pushing force of the clutch member 88 is converted to a force for moving the reel-locking members 62 in the reel 28 radial direction, and the reel-locking members 62 move to the rotation-locking positions. Furthermore, with this structure, when the clutch member 88 is pushed downward, the downward pushing portion 90B enters in between the step portions 72 and the reel-locking members 62 are retained at the rotation-locking positions.

The release operation portion 94 protruding through the gear aperture 20 is pushed upward by a releasing protrusion 104, which is provided protruding from an axially central portion of the rotating shaft 100, in accordance with an operation of meshing of the driving gear 102 of the rotating shaft 100 with the reel gear 42 of the reel 28. Further, the lock operation portion 96 protruding through the through-hole 98 of the ceiling plate 14A is pushed downward by, for example, a locking protrusion 106. The locking protrusion 106 is provided at a side of a space of the drive device in which the recording tape cartridge is loaded that is opposite to a side of the space at which the rotating shaft 100 is disposed, and is brought relatively closer to the case 12 synchronously with an operation of releasing the meshing of the driving gear 102 with the reel gear 42.

At the reel-locking member 62 as described above, a contact member of the present invention is structured by the inverted cam portion 70 and a portion of the upper side guide portion 68 (the edge portion 68A). Together with the cam portion 90 of the clutch member 88 (the cam groove 92), the inverted cam portion 70 and the portion of the upper side guide portion 68 structure a positive motion cam mechanism of the present invention. Furthermore, in the present embodiment, the downward pushing portion 90B structuring the cam portion 90 corresponds to a retaining portion of the present invention.

Now, the recording tape cartridge 10 relating to the present embodiment as described above is not provided with a compression coil spring for urging the reel 28 downward as in the conventional art, which is to say that no urging force from a compression coil spring acts on the portion of meshing between the reel gear and the driving gear. Consequently, it is desirable to specify a greater attractive force on the reel plate 52 from the magnet 108 provided at the rotating shaft 100, in order to mesh the driving gear 102 of the rotating shaft 100 with the reel gear 42 in a state such that the reel 28 is reliably chucked to the rotating shaft 100. Further, it is preferable to avoid thrusting force which acts to separate the reel 28 and the rotating shaft 100 from one another in accordance with driving for rotation of the reel 28 by making faces of the reel gear 42 and the driving gear 102 which mesh with one another are substantially parallel with the rotation axis of the reel 28.

Now, operation of the present embodiment will be described.

With the recording tape cartridge 10 of the structure described above, at times of non-use of the magnetic tape T, because the downward pushing portion 90B of the clutch member 88 is fitted in between the step portions 72 of the reel-locking members 62, the reel-locking members 62 are retained at the rotation-locking positions and movements thereof to the reel 28 axial center sides thereof are blocked. At the reel-locking members 62 which are disposed at the respective rotation-locking positions, the brake gears 66 are meshed with the engaging gear 50 and the stopper portions 74 are inserted in the gap between the disk plate portion 78 and the upper flange 40 of the reel 28 that is sitting on the floor plate 16A. In consequence, rotation of the reel 28 relative to the case 12 is blocked, axial direction movement of the reel 28 is restricted, and the reel 28 is substantially free of looseness in the case 12.

Here, the reel gear 42 of the reel 28 is exposed through the gear aperture 20 and the release operation portion 94 of the clutch member 88 is exposed through the through-hole 48. Further, the lock operation portion 96 of the clutch member 88 passes through the through-hole 98 and protrudes slightly from the ceiling plate 14A, and the aperture 18 is closed off by the leader block 30.

Now, when the magnetic tape T is to be used, the recording tape cartridge 10 is loaded in the direction of arrow A into a bucket (not shown) of a drive device. Hence, when the recording tape cartridge 10 has been loaded to a predetermined depth in the bucket, the lock operation portion 96 protruding from the ceiling plate 14A comes into contact with the locking protrusion 106 of the drive device. From this state, the bucket descends, and the rotating shaft 100 of the drive device relatively approaches (moves upward) toward the gear aperture 20 of the case 12 and retains the reel 28. Specifically, the rotating shaft 100 attracts and retains the reel plate 52 with the magnet 108, in a non-contacting state, and the driving gear 102 of the rotating shaft 100 is meshed with the reel gear 42.

In accordance with this meshing of the reel gear 42 with the driving gear 102, which is to say the relative movement of the rotating shaft 100 in the axial direction toward the case 12, the releasing protrusion 104 of the rotating shaft 100 abuts against the release operation portion 94 of the clutch member 88, and pushes the clutch member 88 upward. As a result, the downward pushing portion 90B of the clutch member 88 is withdrawn from between the step portions 72 of the pair of reel-locking members 62, and the state in which the reel-locking members 62 are retained at the rotation-locking positions is released.

When the clutch member 88 is pushed further upward, the upper face of the upward pushing portion 90A, which defines the lower edges of the cam grooves 92, slides against the respective inverted cam portions 70 of the reel-locking members 62 and moves the reel-locking members 62 toward the axial center. Hence, the stopper portions 74 are withdrawn from between the upper flange 40 and the disk plate portion 78. When the bucket stops at a position at which the rotating shaft 100, whose driving gear 102 is meshed with the reel gear 42, has lifted the reel 28 from the floor plate 16A by a predetermined amount, the reel-locking members 62 reach the rotation-enabling positions at which the meshing of the brake gears 66 with the engaging gear 50 is released. Consequently, the reel 28 is not in contact with the case 12 and rotation of the reel 28 relative to the case 12 is enabled.

In this state, the state of abutting between the release operation portion 94 of the clutch member 88 and the releasing protrusion 104 is maintained, and the reel-locking members 62 are retained at the rotation-enabling positions. In the same state, a protrusion amount of the lock operation portion 96 from the ceiling plate 14A has a magnitude corresponding to the amount by which the clutch member 88 has been pushed up.

Further, when the bucket, and thus the recording tape cartridge 10, is descending in the drive device, the respective positioning pins of the drive device enter into the positioning holes 24 and 26 of the case 12, and the positioning surfaces of the drive device abut against the positioning surfaces 24A and 26A of the case 12. Hence, the recording tape cartridge 10 is positioned in the horizontal direction and the vertical direction with respect to the drive device.

Correspondingly, a drawing-out pin (not shown) of a drawing-out mechanism of the drive device engages with the engaging recess portion 30A of the leader block 30, and the leader block 30 is taken out from the case 12 and guided to a take-up reel of the drive device. The leader block 30 is then fitted into the take-up reel, and the circular arc wall 30B of the leader block 30 structures a portion of a winding surface around which the magnetic tape T is to be wound.

In this state, when the leader block 30 rotates integrally with the take-up reel, the magnetic tape T is wound around a reel hub of the take-up reel while being drawn out from the case 12 through the aperture 18. At this time, the reel 28 of the recording tape cartridge 10 rotates synchronously with the take-up reel, due to rotation force of the rotating shaft 100 being transmitted by the driving gear 102 that is meshed with the reel gear 42. Hence, recording of information to the magnetic tape T and/or replaying of information that has been recorded on the magnetic tape T is implemented by a recording/replaying head which is disposed along a predetermined tape path of the drive device. At this time, the release operation portion 94 of the clutch member 88, which is non-rotatable relative to the case 12, slidingly contacts the releasing protrusion 104 of the rotating shaft 100 which is rotating to drive the reel 28.

Subsequently, when the magnetic tape T has been wound back to the reel 28 again and the leader block 30 has been retained in the vicinity of the aperture 18 of the case 12, the drive device causes the bucket in which the recording tape cartridge 10 is loaded to ascend. Correspondingly, the meshing of the reel gear 42 with the driving gear 102 is released. As a result, the reel 28 is returned to the initial position thereof, at which it is placed on the floor plate 16A. Further, when the bucket ascends, the locking protrusion 106 abuts against the lock operation portion 96 of the clutch member 88 and the clutch member 88 is pushed down in accordance with the ascent.

Correspondingly, the lower face of the downward pushing portion 90B, which defines the upper edges of the cam grooves 92, slides against the respective edge portions 68A of the reel-locking members 62, and the reel-locking members 62 are moved toward the outer periphery of the reel 28. Hence, when the reel-locking members 62 have returned to the rotation-locking positions and the brake gears 66 have meshed with the engaging gear 50, the downward pushing portion 90B is inserted in between the step portions 72 of the pair of reel-locking members 62 in accordance with the operation of pushing down the clutch member 88. Thus, the recording tape cartridge 10 is returned to the initial state thereof.

The operation described above is carried out during a stage of ascent of the bucket by a predetermined amount (an amount the same as the amount of descent), and the bucket stops when it has ascended by the predetermined amount. When the bucket has stopped, the recording tape cartridge 10 is ejected from the bucket in a direction opposite to the direction of arrow A.

Now, because the positive motion cam mechanism is structured by the inverted cam portions 70 and step portions 72 of the reel-locking members 62 with the cam portion 90 of the clutch member 88 (i.e., the cam grooves 92 structured by the upward pushing portion 90A and the downward pushing portion 90B), the reel-locking members 62 can be moved between the rotation-locking positions and the rotation-enabling positions in accordance with directions of operation of the clutch member 88. Therefore, it is possible to realize the function of blocking rotation of the reel 28 at times of non-use without provision of an urging mechanism, such as a compression coil spring or the like, for urging the reel-locking members 62 to the rotation-locking position sides thereof.

Further, because an urging mechanism which urges the reel-locking members to the reel-locking position sides thereof is not provided, an urging force in an axial compression direction does not act at the region at which the release operation portion 94 of the clutch member 88 and the releasing protrusion 104 of the rotating shaft 100 abut. Therefore, friction caused by the release operation portion 94 and the releasing protrusion 104 sliding against one another in accordance with rotary driving of the reel 28 is prevented or greatly suppressed.

Further still, the stopper portions 74, which enter the gap between the upper flange 40 and the disk plate portion 78 (the ceiling plate 14A) when the reel-locking members 62 are disposed at the rotation-locking positions and which are withdrawn from the gap when the reel-locking members 62 are disposed at the rotation-enabling positions, are provided in this recording tape cartridge 10. Therefore, it is possible to prevent or suppress looseness of the reel 28 in the case 12 at times of non-use without providing an urging mechanism such as a compression coil spring or the like for pushing the reel 28 against the case 12. Consequently, it is not necessary to provide a costly bearing or the like in order to absorb relative rotation of the reel 28 and an urging member.

Further again, because the downward pushing portion 90B of the clutch member 88 abuts against the step portions 72 of the reel-locking members 62 that are disposed at the rotation-locking positions and reliably retains these reel-locking members at the rotation-locking positions, rotation of the reel 28 relative to the case 12 and looseness of the reel 28 in the case 12 can be reliably prevented at times of non-use. Moreover, because the downward pushing portion 90B which is provided at the clutch member 88 releases the above-described state of retention of the reel-locking members 62 interlockingly with an operation of the clutch member 88 which moves the reel-locking members 62 to the rotation-enabling positions, the locking mechanism 60 as a whole has simple structure and high reliability, and structure of a drive device is also kept simple.

Further yet, because a plurality (two in the present embodiment) of the reel-locking members 62 which move in the radial direction of the reel 28 and mesh with the engaging gear 50, which is an inward tooth gear provided coaxially at the inner side of the reel hub 32, is provided in the recording tape cartridge 10, even if the reel 28 starts to move in the radial direction, such movement is restricted. Therefore, undesired release of the rotation-locked state of the reel 28 due to looseness in the radial direction of the reel 28 is prevented.

Furthermore, because this plurality of reel-locking members 62 is moved between the respective rotation-locking positions and rotation-enabling positions by operation of the single clutch member 88, the number of components is small and structure of a drive device is not made more complicated. In particular, because the number of the reel-locking members 62 is two in the present embodiment, undesirable complication of the structure (shape) of the clutch member 88 is avoided.

Now, in the embodiment described above, in accordance with driving for rotation of the reel 28, the release operation portion 94 of the clutch member 88 slidingly contacts with the releasing protrusion 104 of the rotating shaft 100. However, an operation method of the recording tape cartridge 10 relating to the present invention is not limited to this. For example, it is also possible, with a drive device which moves the rotating shaft 100 in the axial direction and meshes the driving gear 102 with the reel gear 42, to raise the rotating shaft 100 to move the reel-locking members 62 to the rotation-enabling positions, and then slightly lower the rotating shaft 100 and drive to rotate the reel 28 in a state in which the releasing protrusion 104 is separated from the release operation portion 94. Such a method of operation is enabled by the non-provision of an urging mechanism for urging the reel-locking members 62 to the rotation-locking positions. In such a case, a structure in which, for example, a portion of the lock operation portion 96 fits to the through-hole 98 when the reel-locking members 62 are disposed at the rotation-enabling positions, such that the reel-locking members 62 are reliably retained at the rotation-enabling positions is desirable. Further, the clutch member 88 is not limited to the operation in which the lock operation portion 96 is pushed by the locking protrusion 106 that is fixed at the drive device. For example, the lock operation portion 96 may be pushed for operation by a movable member of the drive device, or the release operation portion 94 may be pulled from a lower side for operation instead of the lock operation portion 96 being provided.

Furthermore, in the embodiment described above, an example has been described in which the positive motion cam mechanism is structured by the cam portion 90 of the clutch member 88 and the inverted cam portions 70 and edge portions 68A (the upper side guide portions 68) of the reel-locking members 62. However, the present invention is not limited to this. For example, structures are also possible in which, for example, the cam grooves 92 are provided at the reel-locking members 62 and contact members, which are inserted into the cam grooves 92, are provided at the clutch member 88. Structures are also possible in which protruding cam rails are provided at the clutch member 88 instead of the cam grooves 92 and the locking mechanism 60 is provided with contact members with "C"-like cross sections, which make contact with these cam rails from upper and lower sides thereof. Moreover, the positive motion cam mechanism is not limited to a structure including the cam grooves 92 which are inclined with respect to the axis of the reel 28. For example, it is possible to provide: a clutch member which is operated by a drive device to reciprocatingly rotate; a locking member which is meshable with the engaging gear 50 or an engaging gear which is provided in an annular form with tooth peaks oriented upward at the base portion 36; and, between the clutch member and the locking member in a plane intersecting the reel axis, a cam portion with a curvilinear form in plan view which causes the locking member to reciprocatingly move substantially in the radial direction of the reel 28 in accordance with the reciprocating rotation of the clutch member. It is also possible to, for example, provide a cam portion which is inclined with respect to the axis in a circumferential plane around the axis, which will reciprocatingly move a locking member in the reel axial direction in accordance with reciprocating rotation of a clutch member, such that the locking member moves toward and away from an engaging portion provided at the base portion 36. Furthermore, an operable member for reciprocatingly rotating such a clutch member is not limited to a structure which is exposed through the gear aperture 20, and may, for example, be exposed through a window portion formed in the peripheral wall 14B of the case 12 or the like.

Further again, the embodiment described above has a structure in which the stopper portion 74 is provided at the reel-locking member 62. However, the present invention is not limited to this, and structures in which the stopper portion 74 is not provided are also possible. In such a case, as long as a structure includes, for example, the angled portions 50A and 66A and the downward pushing portion 90B which is inserted between the step portions 72, looseness of the reel 28 at times of non-use can be prevented or suppressed, as described earlier.

Further yet, the embodiment described above has a structure in which the downward pushing portion 90B of the clutch member 88 abuts against the respective step portions 72 of the reel-locking members 62 to retain the reel-locking members 62 at the rotation-locking positions. However, the present invention is not limited to this. For example, the reel-locking members 62 may be retained at the rotation-locking positions by friction between the reel-locking members 62 and the support member 76 and/or the clutch member 88, or a retaining portion may be provided at the clutch member 88 separately from the cam portion 90, and/or another retaining mechanism may be provided separately from the clutch member 88.

Further still, the embodiment described above has a structure in which two of these reel-locking members 62 are provided. However, the present invention is not limited to this. For example, the locking mechanism 60 may be provided with one or with three or more of the reel-locking members 62. In a case in which three or more of the reel-locking members 62 are provided, the reel-locking members 62 are preferably disposed at equal intervals. Moreover, in a case in which three or more of the reel-locking members 62 are provided, in order to suppress looseness of the reel 28 in the radial directions, it is preferable to specify a large range of meshing of the reel-locking members 62 with the engaging gear 50 in the peripheral direction. In such a case, the clutch member 88 may feature a single cam groove 92 and be disposed to offset from the axial center of the reel 28.

Further yet again, the embodiment described above has a structure in which the recording tape cartridge 10 is a "one-reel" recording tape cartridge accommodating the single reel 28 in the case 12. However, the present invention is not limited to this. For example, the locking mechanism 60 may be provided at one or at both of reels structuring a "two-reel" recording tape cartridge which accommodates two of the reels 28, for taking-out and for taking-up.

Further still again, although the embodiment described above has a structure in which a magnetic tape T is employed as the recording tape, the present invention is not limited to this. It is sufficient that the recording tape is one of long tape-form information recording/replaying media which can record information and replay information that has been recorded. Of course, the recording tape cartridge relating to the present invention can be applied to recording tape of any kind of recording/replaying system.

What is claimed is:

1. A recording tape cartridge which can be loaded at a drive device, the recording tape cartridge comprising:
   a case;
   a reel rotatably accommodated in the case, the reel including a hub formed in a tubular shape, and a recording tape being wound around an outer peripheral portion of the hub;
   an inward tooth gear disposed coaxially at an inner side of the hub, the inward tooth gear ordinarily rotating integrally with the reel;
   a locking member supported to be non-rotatable with respect to the case and disposed within the hub, the locking member being capable, by movement in a radial direction of the hub, of attaining a rotation-locking position, for locking rotation of the reel by meshing with the inward tooth gear, and a release position, for releasing said meshing and enabling rotation of the reel;
   an operable member disposed within the hub, which reciprocatingly moves along an axial direction of the reel in correspondence with an operation mechanism of the drive device; and
   a positive motion cam mechanism including a cam portion, which is disposed at either one of the locking member and the operable member and is inclined with respect to the axial direction of the reel, and a contact member, which is disposed at the other of the locking member and the operable member and slidably contacts the cam portion, the positive motion cam mechanism causing the locking member to move between the rotation-locking position and the release position in accordance with the reciprocating movement of the operable member.

2. The recording tape cartridge of claim 1, wherein the locking member comprises a stopper portion which, when the locking member is disposed at the rotation-locking position, fills a gap between the reel and the case in the reel axial direction, and when the locking member is disposed at the release position, is withdrawn from the gap.

3. The recording tape cartridge of claim 1, wherein the locking member comprises an abutting portion facing toward an axis of the reel axis, and
   the operable member includes a retaining portion which abuts against or is near to the abutting portion when the locking member is disposed at the rotation-locking position, and which moves away from the abutting portion in the reel axial direction in accordance with an operation in which the operable member moves in a direction for moving the locking member toward the release position.

4. The recording tape cartridge of claim 1, wherein the locking member is formed so as to be disposed at the rotation-locking position or the release position by moving in a radial direction of the reel.

5. The recording tape cartridge of claim 1, wherein a plurality of the locking member is provided, and the positive motion cam mechanism is disposed respectively between the plurality of locking members and the operable member.

6. The recording tape cartridge of claim 5, wherein the operable member includes the cam portion of the positive motion cam mechanism, which is structured substantially in a "V" shape in side view, and the locking member includes the contact member.

7. The recording tape cartridge of claim 6, wherein the cam portion comprises an upward pushing portion and a downward pushing portion, the upward pushing portion and the downward pushing portion define a cam groove, and the locking member is moved between the rotation-locking position and the release position by the contact member sliding in the cam groove in accordance with the reciprocating movement of the operable member.

8. A recording tape cartridge which can be loaded at a drive device, the recording tape cartridge comprising:
   a case;
   a reel accommodated in the case, the reel including a tubular hub around which a recording tape is wound at an outer peripheral portion thereof, and an engaging portion provided within the hub;
   a locking member supported to be non-rotatable with respect to the case and disposed within the hub, the locking member being capable of attaining a rotation-locking position, for engaging with the engaging portion and filling a gap between the case and the reel in an axial direction of the reel, and a rotation-enabling position, for releasing the state of engagement with the engaging portion and withdrawing the locking member from the gap;
   a switching member disposed in the case, which retains the locking member at the rotation-locking position at times of non-use of the recording tape, moves the locking member to the rotation-enabling position when operated in a predetermined direction by the drive device, and moves the locking member to the rotation-locking position when operated in a direction opposite to the predetermined direction by the drive device; and
   a positive motion cam mechanism which comprises a cam portion, which is disposed at either one of the locking member and the switching member and is inclined with respect to the axial direction of the reel, and a contact member, which is disposed at the other of the locking member and the operable member and slidably contacts the cam portion, and the positive motion cam mechanism causes the locking member to move between the rotation-locking position and the rotation-enabling position in accordance with reciprocating movement of the switching member in the axial direction of the reel.

9. The recording tape cartridge of claim 8, wherein the locking member comprises an abutting portion facing toward an axis of the reel axis, and
   the switching member includes a retaining portion which abuts against or is near to the abutting portion when the locking member is disposed at the rotation-locking position, and which moves away from the abutting portion in the reel axial direction in accordance with an operation in which the switching member moves in a direction for moving the locking member toward the rotation-enabling position.

10. The recording tape cartridge of claim 8, wherein a plurality of the locking member is provided, and the switching member is disposed between the locking members.

11. The recording tape cartridge of claim 8, wherein the locking member is formed so as to be at the rotation-locking position or the rotation-enabling position by moving in a radial direction of the reel.

12. The recording tape cartridge of claim 8, wherein the switching member includes the cam portion of the positive motion cam mechanism, which is structured substantially in a "V" shape in side view, and the locking member includes the contact member.

13. The recording tape cartridge of claim 12, wherein the cam portion comprises an upward pushing portion and a downward pushing portion, the upward pushing portion and the downward pushing portion define a cam groove, and the locking member is moved between the rotation-locking position and the rotation-enabling position by the contact member sliding in the cam groove in accordance with the reciprocating movement of the switching member.

14. A locking mechanism for locking rotation and enabling rotation of a reel in a recording tape cartridge which can be loaded at a drive device and which includes a case and the reel, the reel being rotatably accommodated in the case, including a hub around which recording tape is wound at an outer peripheral portion thereof, and an engaging portion provided within the hub, the locking mechanism comprising:
- a locking member supported to be non-rotatable with respect to the case and disposed within the hub, the locking member being capable of attaining a rotation-locking position, for engaging with the engaging portion and locking rotation of the reel, and a rotation-enabling position, for releasing the engagement with the engaging portion and enabling rotation of the reel;
- a switching member disposed in the case, which retains the locking member at the rotation-locking position at times of non-use of the recording tape, moves the locking member to the rotation-enabling position when operated in a predetermined direction by the drive device, and moves the locking member to the rotation-locking position when operated in a direction opposite to the predetermined direction by the drive device; and
- a positive motion cam mechanism which comprises a cam portion, which is disposed at either one of the locking member and the switching member and is inclined with respect to the axial direction of the reel, and a contact member, which is disposed at the other of the locking member and the operable member and slidably contacts the cam portion, and the positive motion cam mechanism causes the locking member to move between the rotation-locking position and the rotation-enabling position in accordance with reciprocating movement of the switching member in the axial direction of the reel.

15. The locking mechanism of claim 14, wherein the locking member comprises a stopper portion which, when the locking member is disposed at the rotation-locking position, fills the gap between the reel and the case in the reel axial direction, and when the locking member is disposed at the rotation-enabling position, is withdrawn from the gap.

16. The locking mechanism of claim 14, wherein a plurality of the locking member is provided, and the switching member is disposed between the locking members in alignment with the reel.

17. The locking mechanism of claim 14, wherein the locking member is formed so as to be disposed at the rotation-locking position or the rotation-enabling position by moving in a radial direction of the reel.

18. The locking mechanism of claim 14, wherein the switching member includes the cam portion of the positive motion cam mechanism, which is structured substantially in a "V" shape in side view, and the locking member includes the contact member.

19. The locking mechanism of claim 18, wherein the cam portion comprises an upward pushing portion and a downward pushing portion, the upward pushing portion and the downward pushing portion define a cam groove, and the locking member is moved between the rotation-locking position and the rotation-enabling position by the contact member sliding in the cam groove in accordance with the reciprocating movement of the switching member.

* * * * *